(12) United States Patent
Bordes et al.

(10) Patent No.: US 10,250,877 B2
(45) Date of Patent: Apr. 2, 2019

(54) METHOD AND DEVICE FOR CODING AN IMAGE BLOCK, CORRESPONDING DECODING METHOD AND DECODING DEVICE

(71) Applicant: THOMSON LICENSING, Issy de Moulineaux (FR)

(72) Inventors: Philippe Bordes, Laille (FR); Pierre Andrivon, Liffre (FR); Philippe Salmon, Saint Sulpice la Foret (FR)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 862 days.

(21) Appl. No.: 14/372,021

(22) PCT Filed: Jan. 10, 2013

(86) PCT No.: PCT/EP2013/050399
§ 371 (c)(1),
(2) Date: Jul. 13, 2014

(87) PCT Pub. No.: WO2013/104713
PCT Pub. Date: Jul. 18, 2013

(65) Prior Publication Data
US 2015/0049802 A1 Feb. 19, 2015

(30) Foreign Application Priority Data
Jan. 13, 2012 (FR) ...................... 12 50334

(51) Int. Cl.
*H04N 19/117* (2014.01)
*H04N 19/172* (2014.01)
(Continued)

(52) U.S. Cl.
CPC ......... *H04N 19/117* (2014.11); *H04N 19/105* (2014.11); *H04N 19/146* (2014.11);
(Continued)

(58) Field of Classification Search
CPC .. H04N 19/117; H04N 19/105; H04N 19/146; H04N 19/172; H04N 19/176;
(Continued)

(56) References Cited

U.S. PATENT DOCUMENTS 6,748,018 B2 * 6/2004 Sato ..................... H04N 19/139
348/556
8,199,812 B2 * 6/2012 Ye ........................ H04N 19/105
375/240.02
(Continued)

FOREIGN PATENT DOCUMENTS

EP 1209916 5/2002

OTHER PUBLICATIONS

Bordes et al., "AHG18 resolution adaptation coding using single resolution in DPB", Joint Collaborative Team on Video Coding, 8th Meeting, San José, California, USA, Feb. 1, 2012, pp. 1-11.
(Continued)

*Primary Examiner* — Mohammed S Rahaman
*Assistant Examiner* — Jimmy S Lee
(74) *Attorney, Agent, or Firm* — Tutunjian & Bitetto, P.C.

(57) ABSTRACT

A method is described for reconstructing a current block of a current image from at least one block of a reconstructed reference image at a different size from the size of the current image. The method comprises the steps:
motion compensate the reference block with at least one interpolation filter that depends on the size of said reference image and on the size of said current image,
decode, for the current block, a residue block, and
reconstruct the current block from the residue block and from the motion compensated reference block.

12 Claims, 8 Drawing Sheets

(51) Int. Cl.

| | |
|---|---|
| *H04N 19/44* | (2014.01) |
| *H04N 19/82* | (2014.01) |
| *H04N 19/423* | (2014.01) |
| *H04N 19/523* | (2014.01) |
| *H04N 19/59* | (2014.01) |
| *H04N 19/42* | (2014.01) |
| *H04N 19/105* | (2014.01) |
| *H04N 19/146* | (2014.01) |
| *H04N 19/176* | (2014.01) |
| *H04N 19/80* | (2014.01) |
| *H04N 19/159* | (2014.01) |
| *H04N 19/152* | (2014.01) |
| *H04N 19/33* | (2014.01) |

(52) U.S. Cl.
CPC ......... *H04N 19/172* (2014.11); *H04N 19/176* (2014.11); *H04N 19/423* (2014.11); *H04N 19/439* (2014.11); *H04N 19/44* (2014.11); *H04N 19/523* (2014.11); *H04N 19/59* (2014.11); *H04N 19/80* (2014.11); *H04N 19/82* (2014.11); *H04N 19/152* (2014.11); *H04N 19/159* (2014.11); *H04N 19/33* (2014.11)

(58) Field of Classification Search
CPC .... H04N 19/423; H04N 19/439; H04N 19/44; H04N 19/523; H04N 19/59; H04N 19/80; H04N 19/82; H04N 19/152; H04N 19/159; H04N 19/33
USPC .................................................. 375/240.02
See application file for complete search history.

(56) References Cited

U.S. PATENT DOCUMENTS

| | | | | |
|---|---|---|---|---|
| 8,638,852 | B2* | 1/2014 | Karczewicz | H04N 19/176 375/240.12 |
| 9,813,738 | B2* | 11/2017 | Tsai | H04N 19/176 |
| 2009/0175336 | A1* | 7/2009 | Karczewicz | H04N 19/176 375/240.12 |
| 2010/0226437 | A1* | 9/2010 | Robertson | H04N 19/44 375/240.16 |
| 2012/0082241 | A1* | 4/2012 | Tsai | H04N 19/176 375/240.25 |
| 2013/0003847 | A1* | 1/2013 | Hong | H04N 19/52 375/240.16 |

OTHER PUBLICATIONS

Bross et al., "WD4 Working draft 4 of high efficiency video coding", Joint Collaborative Team on Video Coding, 6th Meeting: Torino, Italy, Jul. 14, 2011, pp. 1-231.

Davies et al., "AHG18 adaptive resolution coding (ARC)", Joint Collaborative Team on Video Coding, 7th Meeting, Geneva, Switzerland, Nov. 21, 2011, pp. 1-12.

Davies et al., "JCTVC AHG report resolution adaptation", Joint Collaborative Team on Video Coding, 7th Meeting, Geneva, Switzerland, Nov. 21, 2011, pp. 1-2.

MPEG 4 ITU-T H264 Standard, "Advanced video coding for generic audiovisual", International Telecommunication Union, May 2003, pp. 1-282.

Davies et al: "Resolution switching for coding efficiency and error reslilience", (Joint collaborative team on video coding of ISO/IEC JTC1/SC29/WG11 and ITU-T SG16); Jul. 15, 2011.

Li et al: "AHG18: Comments on the implementations of resolution adaption on HEVC", 7 JCT-VC Meeting (Joint Collaborative Team on Video Coding of ISO/IEC . . . ), Nov. 8, 2011.

Lee et al: "Hybrid resolution switching method for low bit rate video coding", Image Processing, 2007, ICIP 2007, IEEE Intl Conf on IEEE, Sep. 1, 2007. pp. VI-73.

Wiegand et al: "WD3: Working draft 3 of high-efficiency video coding", No. JCTVC-E603, Mar. 29, 2011, pp. 1-160.

Wittmann et al.: "Separable adaptive interpolation filter for video coding", Image processing, 2008. 15th IEEE Intl Conf, IEEE, Oct. 12, 2008, pp. 2500-2503.

Han et al: "Joint optimization of the motion estimation module and the Up/Down scaler in transcoders", IEEE transactions on circuits and systems for video technology. vol. 15, No. 10, Oct. 1, 2005, pp. 1303-1313.

Schwarz et al: "Overview of the scalable video coding extension of the H.264/AVC standard", IEEE transactions on circuits and systems for video technology. vol. 17, No. 9, Sep. 1, 2007, pp. 1103-1120.

Search Report dated Feb. 8, 2013.

* cited by examiner

$MV = MV_{int} + frac$, with $MV_{int} = int(MV)$ $Xref = int(SXref \times (MV_{int} + Xcur) / SXcur)$

METHOD AND DEVICE FOR CODING AN IMAGE BLOCK, CORRESPONDING DECODING METHOD AND DECODING DEVICE

This application claims the benefit, under 35 U.S.C. § 365 of International Application PCT/EP2013/050399, filed Jan. 10, 2013, which was published in accordance with PCT Article 21(2) on Jul. 18, 2013 in English and which claims the benefit of French patent application No. 1250334, filed Jan. 13, 2012.

1. SCOPE OF THE INVENTION

The invention relates to the general domain of image coding.

The invention more particularly relates to a method for reconstructing an image block from a current image and a method for coding such a block from a block of a reference image reconstructed at a different size from the size of the current image. The invention also relates to the corresponding decoding and coding devices.

2. PRIOR ART

It is known to code a sequence of images to quantize with a quantization step the image data before their coding with view to reduce the output bitrate of the coder. Traditionally, the coder comprises a bitrate control module able to adapt the value of the quantization step so as to obtain the best compromise between the output bitrate of the coder and the distortion of the image signal. When the intended output bitrate or target bitrate is low, greatly increasing the quantization step is not always the best adapted solution as it generally leads to a significant increase in the distortion of the image signal.

Figure 1:
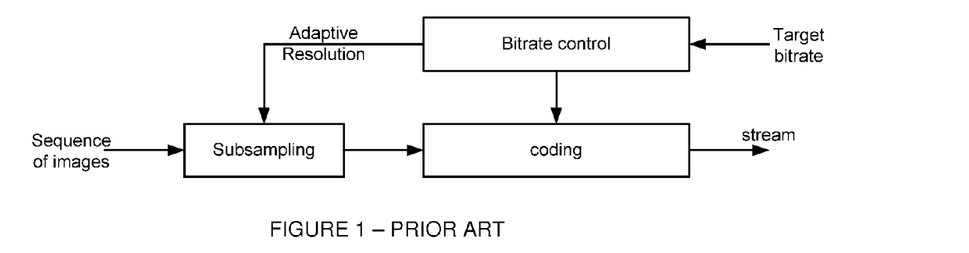
FIG. 1 illustrates a coding device with adaptive resolution according to the prior art.
Figure 2:
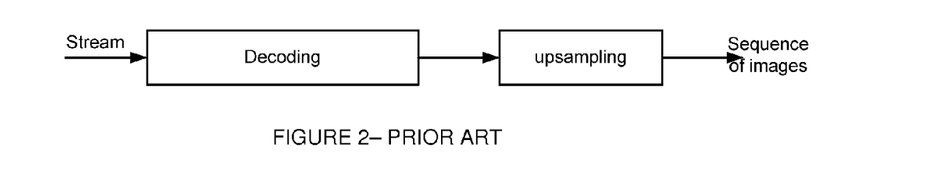
FIG. 2 illustrates a decoding device with adaptive resolution according to the prior art.

Hence, it is known at low bitrates to reduce the size of the image to code by subsampling before coding as illustrated in FIG. 1. In this case, the decoder subsamples the decoded image before its display as shown in FIG. 2. For this purpose, the coded stream comprises a field specifying the size of the original image of the coded image. This dynamic adaptation of the size of the image is known in English terminology as adaptive resolution.

Figure 3:
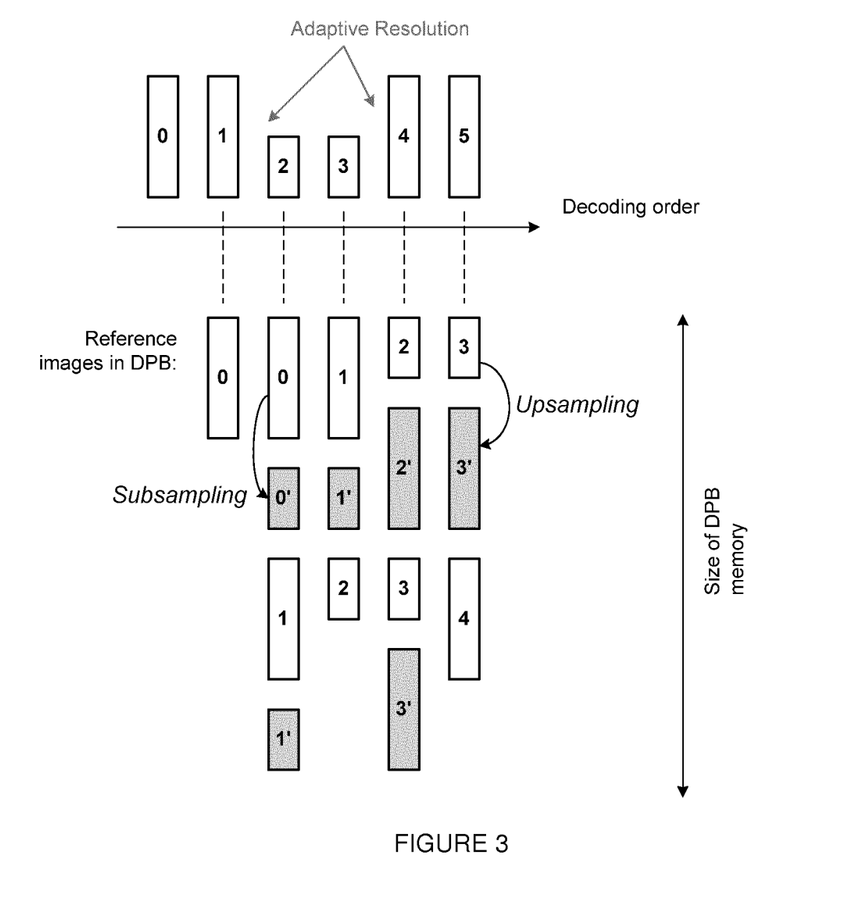
FIG. 3 represents a sequence of 5 images to reconstruct and the change in the composition of the DPB memory of reference images when the last two reconstructed images are used as reference images.

As illustrated in FIG. 3, the adaptive resolution of the size of the image requires the storage in DPB memory (Decoded Picture Buffer) of reconstructed reference images at different sizes. Indeed, the reconstructed images used as reference images are stored in the DPB memory. In the case of the Inter coding mode, the stored reference images are used to determine motion compensated reference blocks. In the particular case of the adaptive resolution method, the reference image used for the motion compensation and the current image to code or to reconstruct from this reference image can be of a different size. Hence, when the reference image has a size less than (respectively greater than) the size of the current image, the reference image must be upsampled (respectively subsampled) to the size of the current image before being motion compensated. The subsampled or upsampled version of the reference image is also stored in the DPB memory. More generally, each reference image is stored in the DPB memory with N different sizes, N being an integer representing the number of sizes allowed by the adaptive resolution method.

In the example referred to in FIG. 3, the last two reconstructed images are used as reference image for the current image. Hence, the image 2 uses the images 0 and 1 as reference images, the image 3 uses the images 1 and 2 as reference images, etc. In this example, N=2. The upsampled and subsampled versions of the reconstructed reference images are greyed out in FIG. 3 and correspond to the additional reference images stored in the DPB memory. The reference images not greyed out are the reconstructed reference images.

The adaptive resolution method thus requires more memory space as several versions (reconstructed image and upsampled and/or subsampled versions) of a same reference image are stored. Increasing the memory size is a problem notably in the hardware implementations for which the surface of the component is notably critical.

3. SUMMARY OF THE INVENTION

The purpose of the invention is to overcome at least one of the disadvantages of the prior art.

For this purpose, the invention relates to a method for reconstructing a current block of a current image from at least one block of a reconstructed reference image at a different size from the size of the current image. The reconstruction method comprises steps to:
  motion compensate the reference block with at least one interpolation filter,
  decode, for the current block, a residue block, and
  reconstruct the current block from the residue block and from the motion compensated reference block.

According to the invention, the interpolation filter depends on the size of the reference image and the size of the current image.

Hence, according to the invention the operations of upsampling or subsampling of the data of the reference image and of motion compensation of a reference block are performed conjointly by applying an interpolation filter that depends on the 'n' index, i.e. on the size of the reference image and on the size of the current image.

According to a particular characteristic of the invention, the interpolation filter is separable into a horizontal filter and a vertical filter.

According to another aspect of the invention, the horizontal filter is composed of a horizontal sub-pixel interpolation filter and a horizontal upsampling filter when the size of the reference image is less than the size of the current image or of horizontal sub-pixel interpolation filter and a horizontal subsampling filter when the size of the reference image is greater than the size of the current image and the vertical filter is composed of a vertical sub-pixel interpolation filter and a vertical upsampling filter when the size of the reference image is less than the size of the current image or of a vertical sub-pixel interpolation filter and a vertical subsampling filter when the size of the reference image is greater than the size of the current image.

Advantageously, the horizontal filter and the vertical filter being defined by filtering coefficients, the reconstruction method further comprises a decoding step of the filtering coefficients.

The invention also relates to a method for coding a current block of a current image from at least one block of a reconstructed reference image at a different size from the size of the current image. The coding method comprises the following steps:
  motion compensate the reference block with at least one interpolation filter,
  calculate, for the current block, a residue block from the current block and from the motion compensated reference block, and code the residue block, According to the invention, the interpolation filter depends on the size of the reference image and the size of the current image.

According to a particular characteristic of the invention, the interpolation filter is separable into a horizontal filter and a vertical filter.

According to another aspect of the invention, an interpolation filter being separable into a horizontal filter and a vertical filter, the horizontal filter is composed of a horizontal sub-pixel interpolation filter and a horizontal upsampling filter when the size of the reference image is less than the size of the current image or of horizontal sub-pixel interpolation filter and a horizontal subsampling filter when the size of the reference image is greater than the size of the current image and the vertical filter is composed of a vertical sub-pixel interpolation filter and a vertical upsampling filter when the size of the reference image is less than the size of the current image or of a vertical sub-pixel interpolation filter and a vertical subsampling filter when the size of the reference image is greater than the size of the current image.

Advantageously, the horizontal filter and the vertical filter being defined by filtering coefficients, the coding method further comprises a coding step of the filtering coefficients.

The invention further relates to a decoding device of a binary stream with a view to reconstructing a current block of a current image from at least one block of a reconstructed reference image at a different size from the size of the current image comprising:
- means to motion compensate the reference block with at least one interpolation filter,
- means to decode, for the current block, a residue block, and
- means to reconstruct the current block from the residue block and from the motion compensated reference block.

According to the invention, the interpolation filter depends on the size of the reference image and the size of the current image.

The invention also relates to a device for coding a current block of a current image from at least one block of a reconstructed reference image at a different size from the size of the current image comprising:
- means to motion compensate the reference block with at least one interpolation filter,
- means to calculate, for the current block, a residue block from the current block and from the motion compensated reference block, and
- means to code the residue block.

According to the invention, the interpolation filter depends on the size of the reference image and the size of the current image.

4. LIST OF FIGURES

The invention will be better understood and illustrated by means of non-restrictive embodiments and advantageous implementations, with reference to the accompanying drawings, wherein.

5. DETAILED DESCRIPTION OF THE INVENTION

Figure 4:
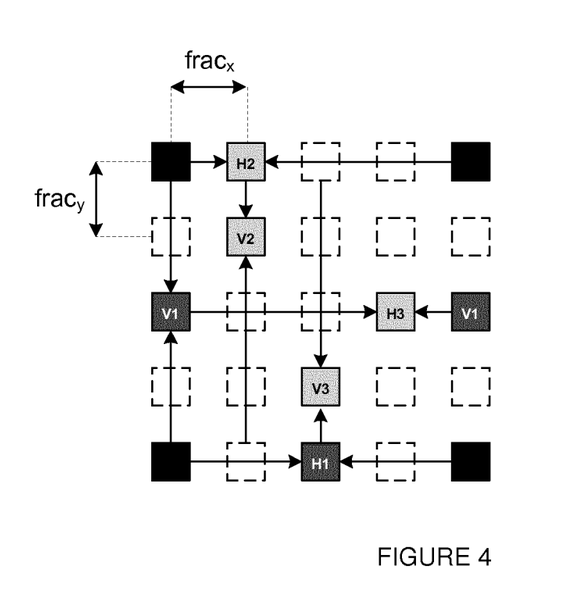
FIG. 4 illustrates the ¼ pixel interpolation of an image block.

The 2D interpolation filters used for the motion compensation and the 2D upsampling and subsampling filters are generally separable filters. Hence, each 2D filter is divided into a 1D vertical filter and a 1D horizontal filter, which are successively applied to the columns and lines of a pixel block or of an image. It is immaterial to apply first the horizontal filter on the lines then the vertical filter on the columns or conversely to apply first the vertical filter on the columns then the horizontal filter on the lines. The separable interpolation filters typically used for motion compensation are noted MCIF (Motion Compensation Interpolation Filter) and are composed of a vertical filter noted $MCIF_V(frac_y)$ and a horizontal filter noted $MCIF_H(frac_x)$. ($frac_x, frac_y$) represents the non-integer part of the position of the pixel to interpolate in relation to the initial grid of pixels or even the fractional part of the motion vector used for the motion compensation. For example, in the case of a ¼ pixel motion compensation, $frac_x \in \{0, 0.25, 0.5, 0.75\}$ and $frac_y \in \{0, 0.25, 0.5, 0.75\}$ as illustrated in FIG. 4. The motion compensation of a pixel block of a reference image is thus obtained by successively applying the filters $MCIF_H(frac_x)$ and $MCIF_V(frac_y)$.

The black squares represent the initial grid of pixels, the other squares represent pixels interpolated by means of the filters $MCIF_H(frac_x)$ and $MCIF_V(frac_y)$. Hence, the pixel H2 is obtained from at least two black pixels located on the same line by applying the filter $MCIF_H(0.25)$. For example, the following filters can be used to interpolate with $frac_{X or Y} = 0, ¼, ½, ¾$:
$\{0, 0, 0, 64, 0, 0, 0, 0\}/64$ with $frac_{X or Y} = 0$,
$\{-1, 4, -10, 57, 19, -7, 3, -1\}/64$ with $frac_{X or Y} = ¼$,
$\{-1, 4, -11, 40, 40, -11, 4, -1\}/64$ with $frac_{X or Y} = ½$,
$\{-1, 3, -7, 19, 57, -10, 4, -1\}/64$ with $frac_{X or Y} = ¾$.

Figure 5:
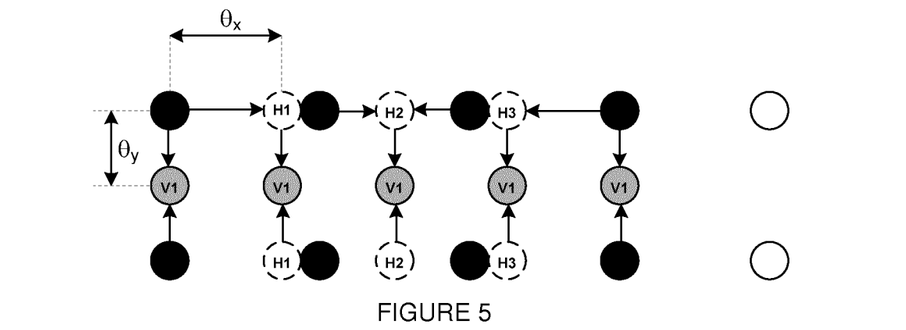
FIG. 5 illustrates a horizontal and vertical upsampling technique of an image.

In the same manner, each upsampling and subsampling filter SCF(n) is separable and is composed of a vertical filter noted $SCF_H(n, \theta_x)$ and a horizontal filter noted $SCF_V(n, \theta_y)$. $(\theta_x; \theta_y)$ represents the position of the upsampled or subsampled pixel in relation to the initial grid of pixels of the reference image. In FIG. 5, the black dots represent the initial grid of pixels. The pixel H1 is obtained from at least two black pixels located on the same line and surrounding it by applying the filter $SCF_H(n,\theta_x)$.

The index n corresponds to a size combination of a reference image such as reconstructed and of a current image to reconstruct. If N image sizes are authorised by the adaptive resolution method, then $n \in [0;N \cdot (N-1)-1]$. In the particular case where N=3, i.e. that 3 image sizes are authorised by the adaptive resolution method then $n \in [0;5]$. Indeed, there is a filter $SCF_H(0,\theta_x)$ to go from size 1 to size 2, a filter $SCF_H(1,\theta_x)$ to go from size 2 to size 1, a filter $SCF_H(2,\theta_x)$ to go from size 1 to size 3, a filter $SCF_H(3,\theta_x)$ to go from size 3 to size 1, a filter $SCF_H(4,\theta_x)$ to go from size 2 to size 3 and a filter $SCF_H(5,\theta_x)$ to go from size 3 to size 2.

The upsampling or subsampling of a reference image is thus obtained by successively applying the filters $SCF_H(n,\theta_x)$ and $SCF_V(n,\theta_y)$ on the lines and columns of the image.

For example, the filter $\{1, -3, 0, 10, 10, 0, -3, 1\}/16$ is used to subsample the image data by 2. In this particular case the filter is independent from the phase. The filter $\{-1, 5, 5, -1\}/8$ is used to subsample the image data by 2 when $\theta_x$ or $\theta_y=0.5$ and $\{0, 8, 0, 0\}/8$ when $\theta_x$ or $\theta_y=0$.

In the prior art, it is thus known to apply the filters $SCF_H(n,\theta_x)$ and $SCF_V(n,\theta_y)$ on the reconstructed reference images with a view to generating upsampled and/or subsampled images which are stored in the DPB memory. In reference to FIG. 3, the reconstructed reference image 1 is stored DPB memory then it is subsampled in an image 1' with the filters $SCF_H(n_a,\theta_x)$ and $SCF_V(n_a,\theta_y)$ which is also stored in the DPB memory. Likewise, the reconstructed reference image 2 is stored in DPB memory then it is upsampled in an image 2' with the filters $SCF_H(n_b,\theta_x)$ and $SCF_V(n_b,\theta_y)$ which is also stored in the DPB memory. $n_a$ and $n_b$ are particular values of n. A current block of the current image is reconstructed from a block belonging to one of the reference images stored in the DPB memory of the same size of the current image. Hence, if the current block belongs to the image 2 on FIG. 3 and is coded in Inter mode from a block of the subsampled image 1, i.e. from the image 1', then the reference block in the image 1' is motion compensated by applying the filters $MCIF_H(frac_x)$ and $MCIF_V(frac_y)$. In this approach, the motion compensation is carried out on a reference block belonging to a reference image possibly upsampled and/or subsampled of the same size as the current image.

The invention relates to a method for reconstructing a current pixel block of a current image from at least one block of a reconstructed reference image at a different size from the size of the current image. The reconstruction method is described with reference to FIG. 6. According to the invention, only the reconstructed reference images are stored in the DPB memory, i.e. the images not greyed out in FIG. 3. In particular, no other upsampled or subsampled version is stored.

Figure 6:
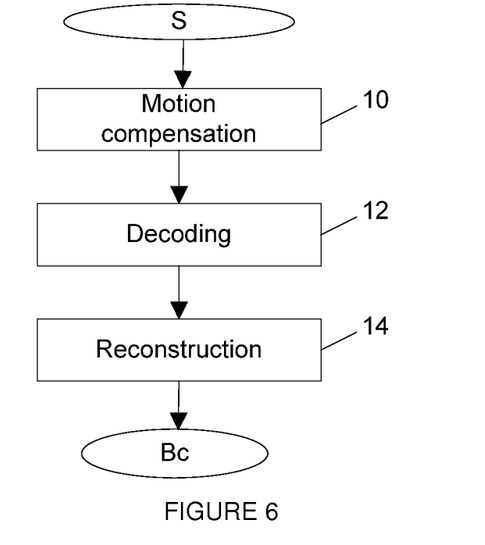
FIG. 6 illustrates a method for reconstructing an image block according to the invention.

During a step 10, the reference block used to reconstruct the current block is motion compensated by means of filters $GF_H$ and $GF_V$ to determine a prediction block Bp. The reference block is generally identified by means of a decoded motion vector MV of components (MVx, MVy).

According to the invention, the horizontal filters $MCIF_H$ and $SCF_H$ are grouped into a single filter $GF_H$ applied on the lines of a pixel block. Likewise, the vertical filters $MCIF_V$ and $SCF_V$ are grouped into a single filter $GF_V$ applied on the columns of a pixel block.

$$GF_H(n,\theta_x,frac_x)=MCIF_H(frac_x) \, o \, SCF_H(n,\theta_x)$$

$$GF_V(n,\theta_y,frac_y)=MCIF_V(frac_y) \, o \, SCF_V(n,\theta_y)$$

where $(f \, o \, h)(x)=f(h(x))$.

"o" is the function composition operator. $GF_H$ and $GF_V$ are always 1D filters. By advantageously grouping, the filters for interpolation and resampling horizontally on the one hand and vertically on the other hand, no resampled reference image, i.e. over- or subsampled, is stored in the DPB memory in addition to the reconstructed reference image.

Hence, according to the invention the operations of upsampling or subsampling of the data of the reference image and of motion compensation of a reference block (to determine the prediction block Bp) are performed jointly by applying a separable interpolation filter successively on the lines and on the columns of pixels of the reference block, which filter depends on the 'n' index, i.e. on the size of the reference image and on the size of the current image.

Figure 7:
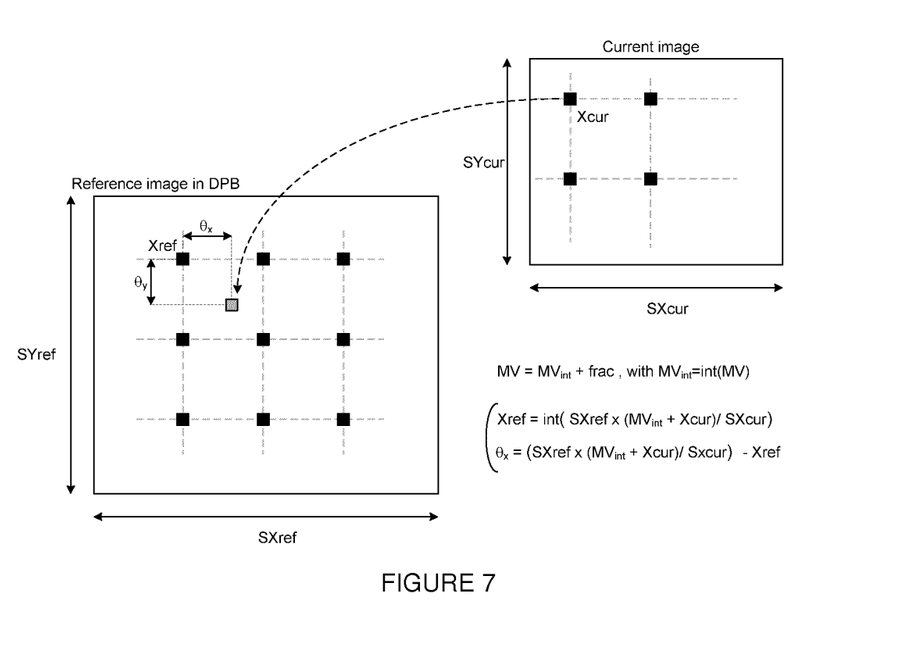
FIG. 7 illustrates a matching of pixels of the current image with pixels of the reference image according to the invention.

For this purpose, to calculate the value of the pixels of the prediction block Bp Pred(Xcur,Ycur), the values Xref(Xcur),$\theta_x$(Xcur), Yref(Ycur) and $\theta_y$(Ycur) are calculated in the following manner as shown in FIG. 7:

$$MVx=MVx_{int}+frac_x, \text{ with } MVx_{int}=int(MVx)$$

$$MVy=MVy_{int}+frac_y, \text{ with } MVy_{int}=int(MVy)$$

$$Xref(Xcur)=int(SXref \cdot (MVx_{int}+Xcur)/SXcur)$$

$$Yref(Ycur)=int(SYref \cdot (MVy_{int}+Ycur)/SYcur)$$

$$\theta_x(Xcur)=(SXref \cdot (MVx_{int}+Xcur)/SXcur)-Xref$$

$$\theta_y(Ycur)=(SYref \cdot (MVy_{int}+Ycur)/SYcur)-Yref$$

(Xref(Xcur), Yref(Ycur)) is the position in the reference image of the motion compensated current pixel with the integer part of MV.

(SXref, SYref) represents the size of the reference image and (SXcur, SYcur) represents the size of the current image.

Figure 8:
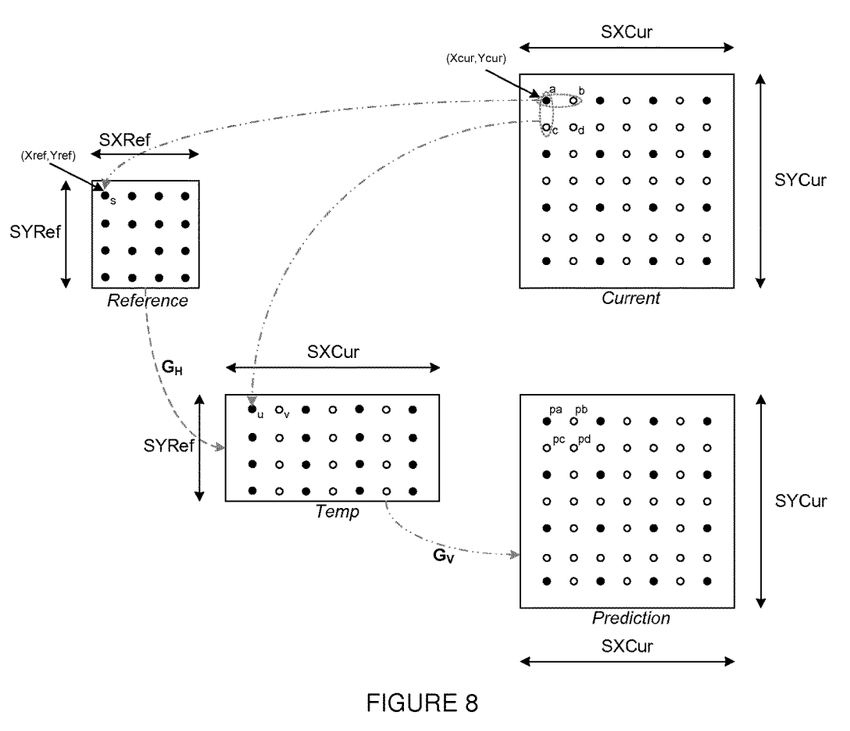
FIG. 8 illustrates the motion compensation method according to the invention.

The filters $GF_H$ and $GF_V$ are then successively applied as shown in FIG. 8 to determine the prediction block Bp.

Two different current pixels (Xcur, Ycur) can be associated with the same pixel (Xref, Yref) in the reference image. They are then distinguished by their phase ($\theta_x$, $\theta_y$). Thus, to predict these two different pixels from the same reference pixel (Xref, Yref) two different filters are applied to the same pixels of the reference image according to the value of the phases.

In FIG. 8, the pixels $\{a,b,c,d\}$ are all associated with the same value (Xref,Yref). They are distinguished by their phase:

$$\theta_x(a)=\theta_x(c)$$

$$\theta_x(b)=\theta_x(d)$$

$$\theta_y(a)=\theta_y(b)$$

$$\theta_y(c)=\theta_y(d)$$

The filters $GF_H$ are first applied as follows:

$$u=GF_H(n,\theta_x(a),frac_x)(s)$$

$$v=GF_H(n,\theta_x(b),frac_x)(s)$$

The filters $GF_V$ are then applied to determine the pixels of Bp:

$$pa=GF_V(n,\theta_y(a),frac_y)(u)$$

$$pb=GF_V(n,\theta_y(b),frac_y)(v)$$

$$pc=GF_V(n,\theta_y(c),frac_y)(u)$$

$$pd=GF_V(n,\theta_y(d),frac_y)(v)$$

According to a variant, $GF_V$ is applied before $GF_H$. For example, the filters can have the following values for an upsampling by two:

$$GF_{H\ or\ V}(n,\theta_x\ or\ \theta_y=0,\text{frac}_{X or Y}=0)=\{0\ 0\ 64\ 0\ 0\}/64$$

$$GF_{H\ or\ V}(n,\theta_x\ or\ \theta_y=0.5,\text{frac}_{X or Y}=0)=\{-8\ 40\ 40\ -8\ 0\}/64$$

$$GF_{H\ or\ V}(n,\theta_x\ or\ \theta_y=0,\text{frac}_{X or Y}=1/4)=\{0\ 1\ 5\ -42\ 499\ 64\ -12\ -3\ 0\}/512$$

$$GF_{H\ or\ V}(n,\theta_x\ or\ \theta_y=0.5,\text{frac}_{X or Y}=1/4)=\{0\ -4\ -45\ 232\ 399\ -73\ 2\ 1\ 0\}/512$$

$$GF_{H\ or\ V}(n,\theta_x\ or\ \theta_y=0,\text{frac}_{X or Y}=1/2)=\{0\ 1\ 6\ -68\ 462\ 143\ -28\ -4\ 0\}/512$$

$$GF_{H\ or\ V}(n,\theta_x\ or\ \theta_y=0.5,\text{frac}_{X or Y}=1/2)=\{0\ -4\ -28\ 143\ 462\ -68\ 6\ 1\ 0\}/512$$

$$GF_{H\ or\ V}(n,\theta_x\ or\ \theta_y=0,\text{frac}_{X or Y}=3/4)=\{0\ 1\ 2\ -73\ 399\ 232\ -45\ -4\ 0\}/512$$

$$GF_{H\ or\ V}(n,\theta_x\ or\ \theta_y=0.5,\text{frac}_{X or Y}=3/4)=\{0\ -3\ -12\ 64\ 499\ -42\ 5\ 1\ 0\}/512$$

During a step 12, a residue block is decoded for the current block. This residue block comes from the decoding of a binary stream representative of a block to reconstruct. Typically, this step comprises the decoding of binary data of the stream into coefficients. The coefficients thus obtained are generally dequantized using a quantization step then transformed into residues.

During a step 14, the current block is reconstructed from the motion compensated reference block, i.e. from the prediction block and the residue block. As an illustrative example, the current block is obtained by pixel to pixel addition of the prediction block and of the residue block or yet by weighted addition taking into account an illumination variation model.

The invention relates to a method for coding a current pixel block of a current image from at least one block of a reconstructed reference image at a different size from the size of the current image. The coding method is described with reference to FIG. 9. According to the invention, only the reconstructed reference images are stored in the DPB memory, i.e. the images not greyed out in FIG. 3. In particular, no other upsampled or subsampled version is stored.

Figure 9:
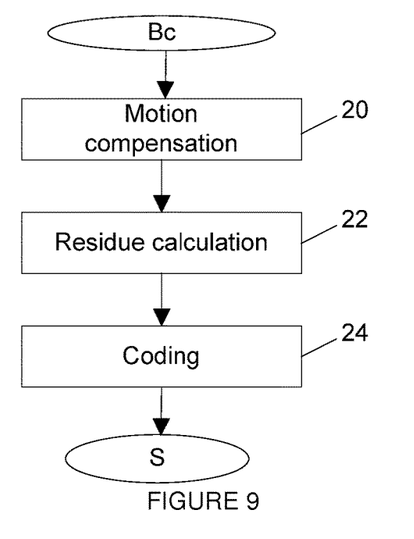
FIG. 9 illustrates a method for coding an image block according to the invention.

During a step 20, the reference block used to code the current block is motion compensated by means of filters $GF_H$ and $GF_V$ to determine a prediction block Bp. The reference block is generally identified by means of a motion vector MV of components (MVx, MVy). MV is determined by a motion estimation method, for example of block matching type. According to the invention, the horizontal filters $MCIF_H$ and $SCF_H$ are grouped into a single filter $GF_H$ applied on the lines of a pixel block. Likewise, the vertical filters $MCIF_V$ and $SCF_V$ are grouped into a single filter $GF_S$ applied on the columns of a pixel block.

$$GF_H(n,\theta_x,\text{frac}_x)=MCIF_H(\text{frac}_x)\ o\ SCF_H(n,\theta_x)$$

$$GF_V(n,\theta_y,\text{frac}_y)=MCIF_V(\text{frac}_y)\ o\ SCF_V(n,\theta_y)$$

where (f o h)(x)=f(h(x)).

"o" is the filter composition operator. $GF_H$ and $GF_V$ are always 1D filters. By advantageously grouping, the interpolation filters and resampling horizontally on the one hand and vertically on the other hand, no resampled reference image, i.e. over- or subsampled, is stored in the DPB memory in addition to the reconstructed reference image.

Hence, according to the invention the operations of upsampling or subsampling of the data of the reference image and of motion compensation of a reference block are performed jointly by applying an interpolation filter successively separable on the lines and the columns of pixels of the reference block, which filter depends on the 'n' index, i.e. on the size of the reference image and on the size of the current image.

For this purpose, to calculate the value of the pixels of the prediction block Pred(Xcur,Ycur), the values Xref(Xcur),$\theta_x$(Xcur), Yref(Ycur) and $\theta_y$(Ycur) are calculated in the following manner as shown in FIG. 7:

$$MVx=MVx_{int}+\text{frac}_x, \text{ with } MVx_{int}=\text{int}(MVx)$$

$$MVy=MVy_{int}+\text{frac}_y, \text{ with } MVy_{int}=\text{int}(MVy)$$

$$Xref(Xcur)=\text{int}(SXref\cdot(MVx_{int}+Xcur)/SXcur)$$

$$Yref(Ycur)=\text{int}(SYref\cdot(MVy_{int}+Ycur)/SYcur)$$

$$\theta_x(Xcur)=(SXref\cdot(MVx_{int}+Xcur)/SXcur)-Xref$$

$$\theta_y(Ycur)=(SYref\cdot(MVy_{int}+Ycur)/SYcur)-Yref$$

(Xref(Xcur), Yref(Ycur)) is the position in the reference image of the current pixel with motion compensated components (Xcur, Ycur) with the integer part of MV.

(SXref, SYref) represents the size of the reference image and (SXcur, SYcur) represents the size of the current image.

The filters $GF_H$ and $GF_V$ are then successively applied as shown in FIG. 8 to determine the prediction block Bp.

Two different current pixels (Xcur, Ycur) can be associated with the same pixel (Xref, Yref) in the reference image. They are then distinguished by their phase ($\theta_x$, $\theta_y$). Thus, to predict these two different pixels from the same reference pixel (Xref, Yref) two different filters are applied to the same pixels of the reference image according to the value of the phases.

In FIG. 8, the pixels {a,b,c,d} are all associated with the same value (Xref,Yref). They are distinguished by their phase:

$$\theta_x(a)=\theta_x(c)$$

$$\theta_x(b)=\theta_x(d)$$

$$\theta_y(a)=\theta_y(b)$$

$$\theta_y(c)=\theta_y(d)$$

The filters $GF_H$ are first applied as follows:

$$u=GF_H(n,\theta_x(a),\text{frac}_x)(s)$$

$$v=GF_H(n,\theta_x(b),\text{frac}_x)(s)$$

s is the pixel of coordinates (Xref, Yref) in the reference image.

The filters $GF_V$ are then applied to determine the pixels of Bp:

$$pa=GF_V(n,\theta_y(a),\text{frac}_y)(u)$$

$$pb=GF_V(n,\theta_y(b),\text{frac}_y)(v)$$

$$pc=GF_V(n,\theta_y(c),\text{frac}_y)(u)$$

$$pd=GF_V(n,\theta_y(d),\text{frac}_y)(v)$$

According to a variant, $GF_V$ is applied before $GF_H$. The same $GF_{H\ or\ V}$ filters given as an example with reference to the reconstruction method can be used by the coding method.

During a step 22, the residue block is calculated from the motion compensated reference block, i.e. from the prediction block and the current block. As an illustrative example, the residue block is obtained by subtracting the prediction block pixel by pixel from the current block or yet by weighted subtraction taking into account an illumination variation model.

During a step 24, the residue block is coded for the current block into a binary stream. Typically, this step comprises the transformation of the residue block into a block of coefficients which are quantized with a quantization step then coded into binary data.

Figure 10:
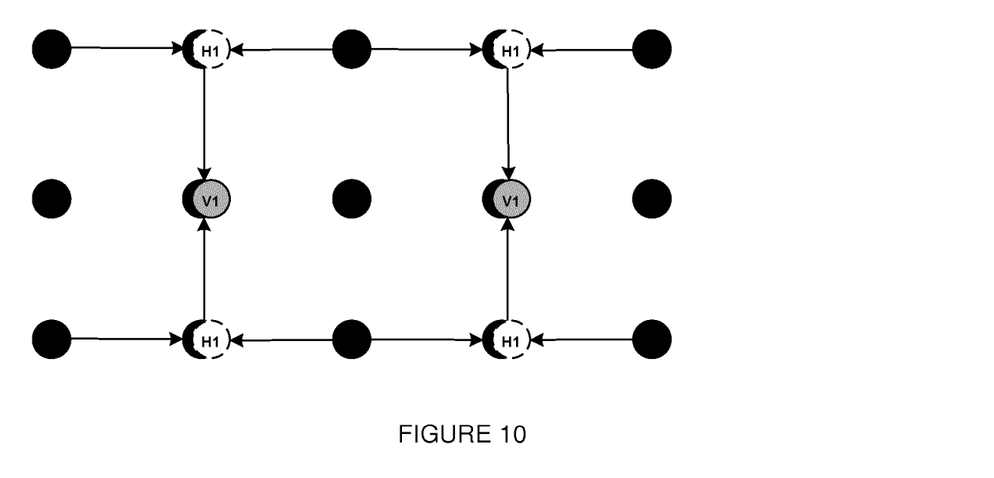
FIG. 10 illustrates a horizontal and vertical subsampling technique of an image.
Figure 11:
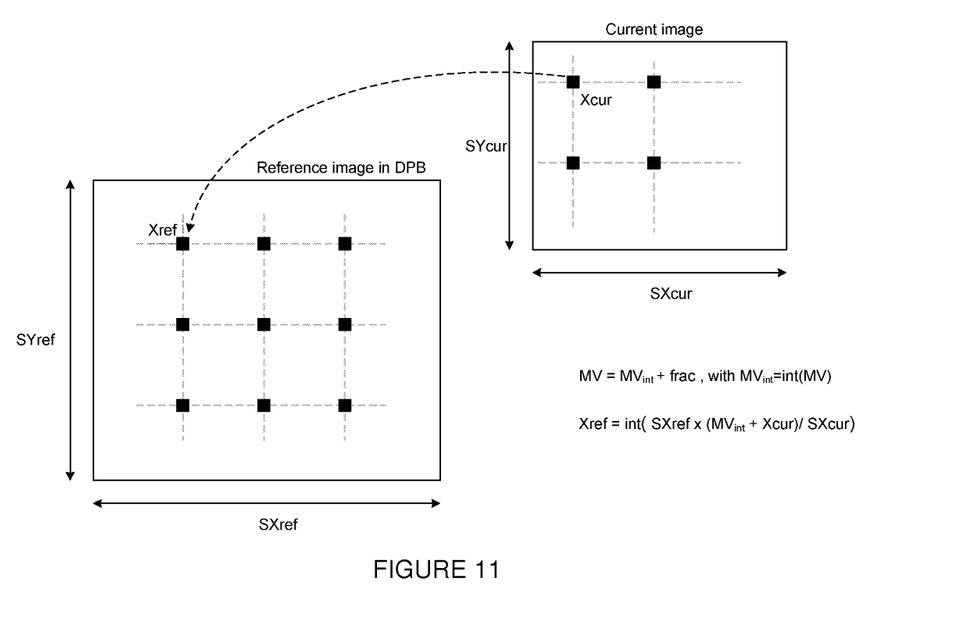
FIG. 11 illustrates a matching of pixels of the current image with pixels of the reference image according to an embodiment variant.

According to an embodiment variant, the filters $SCF_H(n)$ and $SCF_V(n)$ are separate from $\theta_x$ and $\theta_y$ (e.g. subsampling by 2). This variant is applicable to the reconstruction method and to the coding method. It is described in relation to FIGS. 10, 11 and 12. FIG. 10 corresponds to FIG. 5, FIG. 11 corresponds to FIG. 7 and FIG. 12 corresponds to FIG. 8.

According to this variant, to calculate, during steps 10 and 20, the value of the pixels of the prediction block Pred(Xcur, Ycur), the values Xref(Xcur) and Yref(Ycur) are calculated in the following manner as shown in FIG. 10:

$MVx = MVx_i + frac_x$, with $MVx_{int} = int(MVx)$ $MVy = MVy_i + frac_y$, with $MVy_{int} = int(MVy)$ $Xref(Xcur) = int(SXref \cdot (MVx_{int} + Xcur)/SXcur)$ $Yref(Ycur) = int(SYref \cdot (MVy_{int} + Ycur)/SYcur)$ (Xref(Xcur), Yref(Ycur)) is the position in the reference image of the motion compensated current pixel with the integer part of MV.

(SXref, SYref) represents the size of the reference image and (SXcur, SYcur) represents the size of the current image.

The filters $GF_H$ and $GF_V$ are then successively applied as follows to determine the prediction block Bp.

The filters $GF_H$ are first applied as follows:

$u = GF_H(n, frac_x)(s)$

The filters $GF_V$ are then applied to determine the value p of the pixels of Bp:

$p = GF_V(n, frac_y)(u)$

According to a variant, $GF_S$ is applied before $GF_H$.

The other steps of the reconstruction and coding methods are unchanged.

According to a particular embodiment of the invention, the binary stream is a scalable binary stream. The scalable binary stream comprises a base layer coding low resolution images and at least one enhancement layer coding high resolution images, i.e. the resolution of which is greater than that of the low resolution images. The current image is one of the high resolution images and the reference image is one of the low resolution images. The reconstructed low resolution images thus being used to predict the high resolution images are then stored in low resolution, i.e. in their original resolution, in the DPB memory of the enhancement layer.

Figure 12:
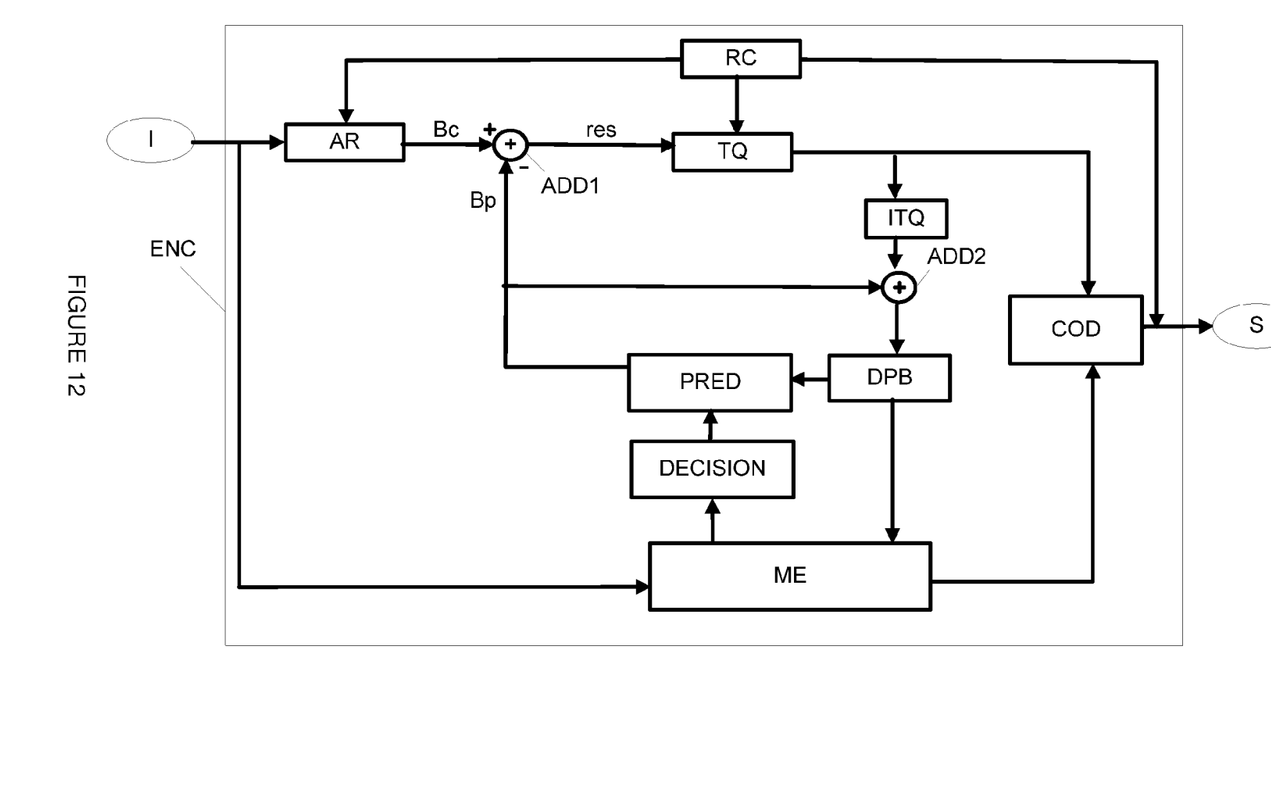
FIG. 12 illustrates a coding device according to the invention.
Figure 13:
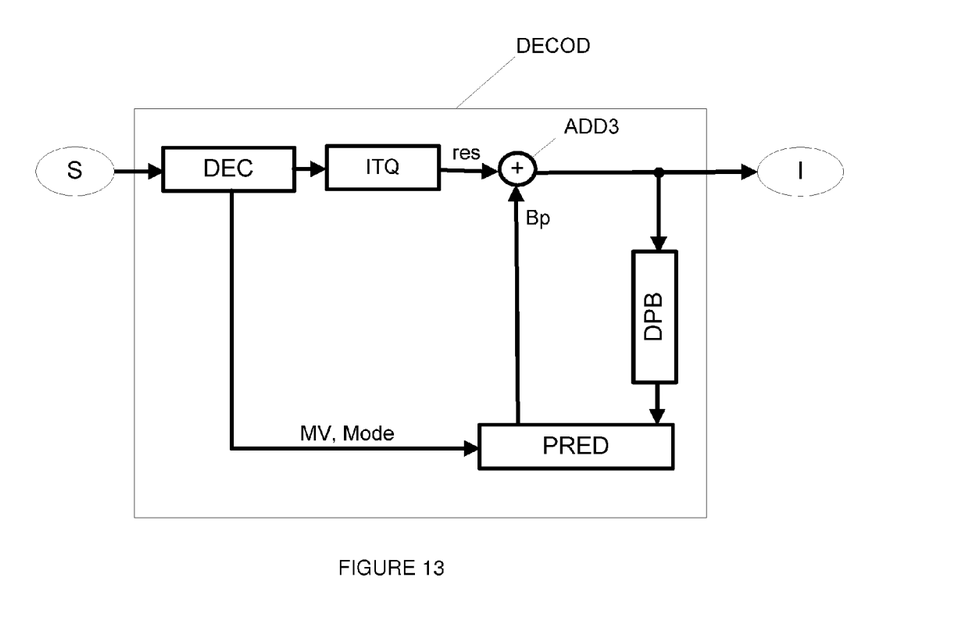
FIG. 13 illustrates a decoding device according to the invention.

The invention further relates to a coding device ENC described with reference to FIG. 12 and a decoding device DECOD described with reference to FIG. 13. In this figure, the modules shown are functional units that may or may not correspond to physically distinguishable units. For example, these modules or some of them can be grouped together in a single component or circuit, or constitute functions of the same software. On the contrary, some modules may be composed of separate physical entities.

The coding device ENC receives at input images I belonging to a sequence of images. Each image is divided into blocks of pixels each of which is associated with at least one item of image data, e.g. of luminance and/or of chrominance. The coding device ENC notably implements a coding with temporal prediction. Only the modules of the coding device ENC relating to coding by temporal prediction or INTER coding are represented in FIG. 12. Other modules not represented and known to those skilled in the art of video coders implement the INTRA coding with or without spatial prediction. The coding device ENC notably comprises a calculation module ADD1 capable of subtracting pixel by pixel from a current block Bc a prediction block Bp to generate a residue or residual block noted res. It further comprises a module TQ capable of transforming then quantizing the residual block res into quantized data. The transform T is for example a DCT. The coding device ENC further comprises an entropy coding module COD able to code the quantized data into a binary stream S. It further comprises a module ITO carrying out the reverse operation of module TQ. The module ITQ carries out a reverse quantization followed by an inverse transform. The module ITQ is connected to a calculation module ADD2 able to add pixel by pixel the block of data from the module ITQ and the prediction block Bp to generate a block of reconstructed image data that is stored in a DPB memory. The module AR is able to subsample the images at the input of the coder notably with a view to improving the bitrate-distortion compromise, i.e. notably to increase the constant bitrate reconstruction quality, the bitrate being determined by a bitrate control module.

The coding device ENC further comprises a motion estimation module ME able to estimate at least one motion vector MV between the block Bc and a reference image Ir stored in the DPB memory or between the block Bc and the version Ir' of the resampled reference image Ir at the size of the current image. According to one variant, the motion estimation is made between the current block Bc and the source image corresponding to Ir, in which case the DPB memory is not connected to the motion estimation module ME. The motion data are transmitted by the motion estimation module ME to a decision module DECISION able to select a coding mode for the block Bc in a predefined set of coding modes. The chosen coding mode is for example the one that minimises a bitrate-distortion type criterion. However, the invention is not restricted to this selection method and the mode chosen can be selected according to another criterion for example an a priori type criterion. The coding mode selected by the decision module DECISION as well as the motion data, for example the motion vector or vectors in the case of the temporal prediction mode or INTER mode are transmitted to a prediction module PRED, also called motion compensation module. The motion vector or vectors and the selected coding mode are moreover transmitted to the entropy coding module COD to be coded in the stream S. If a coding mode INTER is retained by the decision module DECISION the prediction module PRED then determines from the reference image Ir previously reconstructed and stored in the DPB memory, the prediction block Bp from the motion vector MV determined by the motion estimation module ME. The prediction module PRED is able to determine the prediction block according to step 20 of the coding method described with reference to FIG. 9. The calculation module ADD1 is able to implement step 22 of the coding method. Step 24 of the coding method is implemented by the modules TQ and COD.

The decoding device DECOD is described with reference to FIG. 13. The decoding device DECOD receives at input a binary stream S representative of a sequence of images. The stream S is for example transmitted by a coding device ENC. The decoding device DECOD comprises an entropy decoding module DEC able to generate decoded data, for example coding modes and decoded data relating to the content of the images. The decoding device DECOD further comprises a motion data reconstruction module. According to a first embodiment, the motion data reconstruction module is the entropic decoding module DEC that decodes a part of the stream S representative of motion vectors.

According to a variant not shown in FIG. 9, the motion data reconstruction module is a motion estimation module. This solution for reconstructing motion data by the decoding device DECOD is known as "template matching".

The decoded data relating to the content of the pictures is then sent to a module ITO capable of carrying out a reverse quantization followed by an inverse transformation. The module ITO is identical to the module ITO of the coding device ENC having generated the stream S. The module ITO is connected to a calculation module ADD3 able to add pixel by pixel the block from the module ITO and a prediction block Bp to generate a block of reconstructed image data that is stored in a DPB memory. The decoding device DECOD further comprises a prediction module PRED identical to the prediction module PRED of the coding device 12. If a coding mode INTER is decoded, the prediction module PRED determines from a reference image Ir previously reconstructed and stored in the DPB memory, the reference block Bp from the motion vector Vp decoded for the current block Bc by the entropy decoding module DEC.

The prediction module PRED is able to determine the prediction block according to step 10 of the reconstruction method described with reference to FIG. 6. The calculation module ADD3 is able to implement step 14 of the reconstruction method. Step 12 of the reconstruction method is implemented by the modules DEC and ITQ.

The invention claimed is:

1. A decoding method of a binary stream to reconstruct a current block of a current image from a reference block of a reference image reconstructed at a different size from the size of said current image, said reconstructed reference image being stored in a decoded picture buffer comprising:
   motion compensating said reference block of said reconstructed reference image by applying a single horizontal filter GFH and a single vertical filter GFv successively on the lines and on the columns of pixels of said reference block,
   decoding, for the current block, a residue block, and reconstructing the current block from said residue block and from said motion compensated reference block,
      wherein said single vertical filter GFv applied on a pixel s is such that $GFv(s)=MCIFv(SCFv(s))$, where MCIFv is a vertical motion compensation interpolation filter and SCFv is a vertical resampling filter, MCIFv and SCFv being applied jointly and wherein said single horizontal filter GFH applied on a pixel u is such that $GFH(u)=MCIFH(SCFH(u))$, where MCIFH is a horizontal motion compensation interpolation filter and SCFH is a horizontal resampling filter, MCIFH and SCFH being applied jointly and wherein no resampled version of said reconstructed reference image is stored in the decoded picture buffer.

2. The decoding method according to claim 1, wherein the single horizontal filter and the single vertical filter being defined by filtering coefficients, said decoding method further comprises a decoding step of said filtering coefficients.

3. The decoding method according to claim 1, wherein said binary stream is a scalable stream comprising a base layer coding low resolution images and at least one enhancement layer coding high resolution images, said current image is one of said high resolution images and said reference image is one of the low resolution images.

4. A coding method of a current block of a current image from a reference block of a reference image reconstructed at a different size from the size of said current image, said reconstructed reference image being stored in a decoded picture buffer comprising:
   motion compensating said reference block of said reconstructed reference image by applying a single horizontal filter GFH and a single vertical filter GFv successively on the lines and on the columns of pixels of said reference block,
   calculating, for the current block, a residue block from said current block and from said motion compensated reference block, and
   coding the residue block in a binary stream,
      wherein said single vertical filter GFv applied on a pixel s is such that $GFv(s)=MCIFv(SCFv(s))$, where MCIFv is a vertical motion compensation interpolation filter and SCFv is a vertical resampling filter, MCIFv and SCFv being applied jointly and wherein said single horizontal filter GFH applied on a pixel u is such that $GFH(u)=MCIFH(SCFH(u))$, where MCIFH is a horizontal motion compensation interpolation filter and SCFH is a horizontal resampling filter, MCIFH and SCFH being applied jointly and wherein no resampled version of said reconstructed reference image is stored in the decoded picture buffer.

5. The coding method according to claim 4, wherein the single horizontal filter and the single vertical filter being defined by filtering coefficients, said coding method further comprises a coding step of said filtering coefficients.

6. The coding method according to claim 4, wherein said binary stream is a scalable stream comprising a base layer coding low resolution images and at least one enhancement layer coding high resolution images, said current image is one of said high resolution images and said reference image is one of the low resolution images.

7. A decoding device comprising at least one circuit configured to:
   access, from a decoded picture buffer, a reference image reconstructed at a size different from the size of a current image;
   motion compensate a reference block of said reconstructed reference image by applying a single horizontal filter GFH and a single vertical filter GFv successively on the lines and on the columns of pixels of said reference block,
   decode, for a current block of said current image, a residue block from a binary stream, and
   reconstruct the current block from said residue block and from said motion compensated reference block,
      wherein said single vertical filter GFv applied on a pixel s is such that $GFv(s)=MCIFv(SCFv(s))$, where MCIFv is a vertical motion compensation interpolation filter and SCFv is a vertical resampling filter, MCIFv and SCFv being applied jointly and wherein said single horizontal filter GFH applied on a pixel u is such that GFH(u)=MCIFH(SCFH(u)), where MCIFH is a horizontal motion compensation interpolation filter and SCFH is a horizontal resampling filter, MCIFH and SCFH being applied jointly and wherein no resampled version of said reconstructed reference image is stored in the decoded picture buffer.

8. A coding device comprising at least one circuit configured to:

access, from a decoded picture buffer, a reference image reconstructed at a size different from the size of a current image;

motion compensate a reference block of said reconstructed reference image by applying a single horizontal filter GFH and a single vertical filter GFv successively on the lines and on the columns of pixels of said reference block, calculate, for a current block of said current image, a residue block from said current block and from said motion compensated reference block, and code the residue block in a binary stream, wherein said single vertical filter GFv applied on a pixel s is such that GFv(s)=MCIFv(SCFv(s)), where MCIFv is a vertical motion compensation interpolation filter and SCFv is a vertical resampling filter, MCIFv and SCFv being applied jointly and wherein said single horizontal filter GFH applied on a pixel u is such that GFH(u)=MCIFH(SCFH(u)), where MCIFH is a horizontal motion compensation interpolation filter and SCFH is a horizontal resampling filter, MCIFH and SCFH being applied jointly and wherein no resampled version of said reconstructed reference image is stored in the decoded picture buffer.

9. The decoding device according to claim 7, wherein the single horizontal filter and the single vertical filter being defined by filtering coefficients, said decoding device further comprises a module configured to decode said filtering coefficients.

10. The decoding device according to claim 7, wherein said binary stream is a scalable stream comprising a base layer coding low resolution images and at least one enhancement layer coding high resolution images, said current image is one of said high resolution images and said reference image is one of the low resolution images.

11. The coding device according to claim 8, wherein the single horizontal filter and the single vertical filter being defined by filtering coefficients, said coding device further comprises a module configured to code said filtering coefficients.

12. The coding device according to claim 8, wherein said binary stream is a scalable stream comprising a base layer coding low resolution images and at least one enhancement layer coding high resolution images, said current image is one of said high resolution images and said reference image is one of the low resolution images.

* * * * *

UNITED STATES PATENT AND TRADEMARK OFFICE
CERTIFICATE OF CORRECTION

Page 1 of 2

PATENT NO. : 10,250,877 B2
APPLICATION NO. : 14/372021
DATED : April 2, 2019
INVENTOR(S) : Bordes et al.

It is certified that error appears in the above-identified patent and that said Letters Patent is hereby corrected as shown below:

On the Title Page

Item (56) Page 2 Column 2 (Other Publications) Line 14 Delete "reslilience"," and insert --resilience",--.

In the Drawings

Figure 7 and on the Title Page, the illustrative figure, Line 6 Delete "int( SXref" and insert --int(SXref--.

Figure 7 and on the Title Page, the illustrative figure, Line 7 Delete "Sxcur)     - Xref" and insert --Sxcur) - Xref--.

Figure 11 Line 6 Delete "int( SXref" and insert --int(SXref--.

In the Specification

Column 1 Line 6 Delete "365" and insert --371--.

Column 7 Line 57 Delete "MCIFy" and insert --MCIFV--.

Column 7 Line 57 Delete "GFS" and insert --GFV--.

Column 9 Line 48 Delete "GFS" and insert --GFV--.

Column 10 Line 24 Delete "ITO" and insert --ITQ--.

Column 11 Line 22 Delete "ITO" and insert --ITQ--.

Signed and Sealed this
Seventh Day of February, 2023

Katherine Kelly Vidal
*Director of the United States Patent and Trademark Office*

CERTIFICATE OF CORRECTION (continued)
U.S. Pat. No. 10,250,877 B2

Column 11 Line 24 Delete "ITO" and insert --ITQ--.

Column 11 Line 24 Delete "ITO" and insert --ITQ--.